(12) United States Patent  (10) Patent No.: US 9,357,159 B2
Martch et al.  (45) Date of Patent: May 31, 2016

(54) GROUPING AND PRESENTING CONTENT

(75) Inventors: Henry Gregg Martch, Parker, CO (US); Max S. Gratton, Lakewood, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 13/292,047

(22) Filed: Nov. 8, 2011

(65) Prior Publication Data

US 2013/0051766 A1 Feb. 28, 2013

Related U.S. Application Data

(60) Provisional application No. 61/526,506, filed on Aug. 23, 2011.

(51) Int. Cl.
*H04N 5/782* (2006.01)
*H04N 21/43* (2011.01)
(Continued)

(52) U.S. Cl.
CPC ........... *H04N 5/782* (2013.01); *H04N 21/4334* (2013.01); *H04N 21/47214* (2013.01); *H04N 21/84* (2013.01); *H04N 21/4405* (2013.01)

(58) Field of Classification Search
CPC ......... H04N 5/76; H04N 5/765; H04N 5/775; H04N 21/4334; H04N 21/4335; H04N 21/4405; H04N 21/47214; H04N 21/4821; H04N 21/84; H04N 5/782; H04N 21/2365; H04N 21/23895; H04N 21/2668; H04N 21/4325; H04N 21/43853; H04N 21/4622; H04N 21/4823; H04N 21/4825; H04N 21/6543
USPC ................................................. 386/291–293
See application file for complete search history.

(56) References Cited

U.S. PATENT DOCUMENTS 4,706,121 A 11/1987 Young
4,723,246 A 2/1988 Weldon, Jr.
(Continued)

FOREIGN PATENT DOCUMENTS

CN 101202600 A 6/2008
CN 101310532 A 11/2008
(Continued)

OTHER PUBLICATIONS

Author Unknown, "Move Networks is Delivering the Next Generation of Television," Move Networks, 2010, obtained online at http://www.movenetworks.com/, 2 pages.
(Continued)

*Primary Examiner* — Gelek W Topgyal
(74) *Attorney, Agent, or Firm* — Kilpatrick Townsend & Stockton LLP

(57) ABSTRACT

A provider transmits instructions to a receiver to record multiple instances of content. The instances of content are included in the same frequency band of a broadcast signal transmitted via a first communication link and encoded utilizing a common encryption. The provider determines to supplement and transmits an instruction to record a supplemental instance of content from a second content provider via a second communication link. The receiver receives the instructions and accordingly receives, decodes, and stores the multiple instances of content and the supplemental content. A recorder in communication with the receiver determines whether a content selection is a member of a content group. The group determination is based on a tag of the content selection. If the content selection is a member of the content group, the recorder presents to a display device the content selection and at least one other member of the content group.

20 Claims, 5 Drawing Sheets

(51) Int. Cl.
*H04N 21/472* (2011.01)
*H04N 21/84* (2011.01)
*H04N 21/4405* (2011.01)
*H04N 21/433* (2011.01)

(56) References Cited

U.S. PATENT DOCUMENTS

| | | | |
|---|---|---|---|
| 4,802,215 A | 1/1989 | Mason | |
| 5,187,589 A | 2/1993 | Kono et al. | |
| 5,335,277 A | 8/1994 | Harvey et al. | |
| 5,483,277 A | 1/1996 | Granger | |
| 5,488,658 A | 1/1996 | Hirashima | |
| 5,541,738 A | 7/1996 | Mankovitz | |
| 5,642,153 A | 6/1997 | Chaney et al. | |
| 5,682,597 A | 10/1997 | Ganek et al. | |
| 5,684,969 A | 11/1997 | Ishida | |
| 5,724,646 A | 3/1998 | Ganek et al. | |
| 5,805,763 A | 9/1998 | Lawler et al. | |
| 5,974,218 A | 10/1999 | Nagasaka et al. | |
| 6,049,333 A | 4/2000 | LaJoie et al. | |
| 6,263,504 B1 | 7/2001 | Ebisawa | |
| 6,453,115 B1 | 9/2002 | Boyle | |
| 6,628,891 B1 | 9/2003 | Vantalon et al. | |
| 6,701,528 B1 | 3/2004 | Arsenault et al. | |
| 6,766,523 B2 | 7/2004 | Herley | |
| 6,798,971 B2 | 9/2004 | Potrebic | |
| 6,938,208 B2 | 8/2005 | Reichardt | |
| 7,024,676 B1 | 4/2006 | Klopfenstein | |
| 7,409,140 B2 | 8/2008 | Rodriguez et al. | |
| 7,487,529 B1 | 2/2009 | Orlick | |
| 7,490,169 B1 | 2/2009 | Ogdon et al. | |
| 7,493,312 B2 | 2/2009 | Liu et al. | |
| 7,505,081 B2 | 3/2009 | Eshleman | |
| 7,542,656 B2 | 6/2009 | Cho et al. | |
| 7,577,751 B2 | 8/2009 | Vinson et al. | |
| 7,590,993 B1 | 9/2009 | Hendricks et al. | |
| 7,684,672 B2 | 3/2010 | Matoba | |
| 7,715,552 B2 | 5/2010 | Pinder et al. | |
| 7,730,517 B1 | 6/2010 | Rey et al. | |
| 7,739,711 B2 | 6/2010 | Finseth et al. | |
| 7,760,986 B2 | 7/2010 | Beuque | |
| 7,804,861 B2 | 9/2010 | Kim | |
| 7,848,618 B2 | 12/2010 | Potrebic et al. | |
| 7,856,557 B2 | 12/2010 | Beuque | |
| 7,926,078 B2 | 4/2011 | Arsenault et al. | |
| 7,929,697 B2 | 4/2011 | McNeely et al. | |
| 7,962,937 B2 * | 6/2011 | Cho et al. | 725/44 |
| 8,006,268 B2 | 8/2011 | Sloo | |
| 8,201,194 B2 | 6/2012 | Wijnands et al. | |
| 8,321,466 B2 | 11/2012 | Black et al. | |
| 8,364,671 B1 | 1/2013 | Sinton et al. | |
| 8,437,622 B2 | 5/2013 | Casagrande | |
| 8,447,170 B2 | 5/2013 | Casagrande | |
| 8,566,873 B2 | 10/2013 | Sie et al. | |
| 8,584,167 B2 | 11/2013 | Vanduyn | |
| 8,606,088 B2 | 12/2013 | Kummer et al. | |
| 8,627,349 B2 | 1/2014 | Kirby et al. | |
| 8,660,412 B2 | 2/2014 | Kummer et al. | |
| 8,763,027 B2 | 6/2014 | Martch | |
| 8,774,608 B2 | 7/2014 | Kummer et al. | |
| 8,819,722 B2 | 8/2014 | Kummer et al. | |
| 8,819,761 B2 | 8/2014 | Minnick | |
| 8,850,476 B2 | 9/2014 | VanDuyn et al. | |
| 8,867,893 B2 | 10/2014 | Kirby | |
| 8,959,544 B2 | 2/2015 | Kummer et al. | |
| 8,959,566 B2 | 2/2015 | Kummer | |
| 8,989,562 B2 | 3/2015 | Kummer et al. | |
| 8,997,153 B2 | 3/2015 | Templeman | |
| 9,031,385 B2 | 5/2015 | Casagrande et al. | |
| 9,043,843 B2 | 5/2015 | Templeman et al. | |
| 9,055,274 B2 | 6/2015 | Casagrande | |
| 9,066,156 B2 | 6/2015 | Kapa | |
| 9,088,763 B2 | 7/2015 | Martch et al. | |
| 9,113,222 B2 | 8/2015 | VanDuyn | |
| 9,177,605 B2 | 11/2015 | Minnick et al. | |
| 9,177,606 B2 | 11/2015 | Kirby | |
| 9,185,331 B2 | 11/2015 | Martch et al. | |
| 9,191,694 B2 | 11/2015 | Casagrande | |
| 9,202,524 B2 | 12/2015 | Martch et al. | |
| 9,264,779 B2 | 2/2016 | Kirby et al. | |
| 9,269,397 B2 | 2/2016 | Casagrande et al. | |
| 2001/0028782 A1 | 10/2001 | Ohno et al. | |
| 2001/0033736 A1 | 10/2001 | Yap et al. | |
| 2001/0034787 A1 | 10/2001 | Takao et al. | |
| 2002/0044658 A1 | 4/2002 | Wasilewski et al. | |
| 2002/0054752 A1 | 5/2002 | Wood et al. | |
| 2002/0055343 A1 | 5/2002 | Stetzler et al. | |
| 2002/0087979 A1 | 7/2002 | Dudkiewicz et al. | |
| 2002/0087983 A1 | 7/2002 | Son et al. | |
| 2002/0092021 A1 | 7/2002 | Yap et al. | |
| 2002/0095510 A1 | 7/2002 | Sie et al. | |
| 2002/0097340 A1 | 7/2002 | Takagi et al. | |
| 2002/0116705 A1 | 8/2002 | Perlman | |
| 2002/0120925 A1 | 8/2002 | Logan | |
| 2002/0141431 A1 | 10/2002 | Tripathy | |
| 2002/0144266 A1 | 10/2002 | Goldman et al. | |
| 2002/0152299 A1 | 10/2002 | Traversat et al. | |
| 2002/0164147 A1 | 11/2002 | Suda | |
| 2002/0168178 A1 | 11/2002 | Rodriguez et al. | |
| 2002/0174430 A1 | 11/2002 | Ellis et al. | |
| 2002/0184638 A1 | 12/2002 | Agnihotri et al. | |
| 2002/0188943 A1 | 12/2002 | Freeman et al. | |
| 2003/0005454 A1 | 1/2003 | Rodriguez et al. | |
| 2003/0026423 A1 | 2/2003 | Unger et al. | |
| 2003/0078930 A1 | 4/2003 | Surcouf et al. | |
| 2003/0110514 A1 | 6/2003 | West et al. | |
| 2003/0149988 A1 | 8/2003 | Ellis et al. | |
| 2003/0152360 A1 | 8/2003 | Mukai et al. | |
| 2003/0156826 A1 | 8/2003 | Sonoda et al. | |
| 2003/0177492 A1 | 9/2003 | Kanou | |
| 2003/0177495 A1 | 9/2003 | Needham et al. | |
| 2003/0200548 A1 | 10/2003 | Baran et al. | |
| 2003/0208763 A1 | 11/2003 | McElhatten et al. | |
| 2003/0208767 A1 | 11/2003 | Williamson et al. | |
| 2003/0226150 A1 | 12/2003 | Berberet et al. | |
| 2004/0001087 A1 | 1/2004 | Warmus et al. | |
| 2004/0003118 A1 | 1/2004 | Brown et al. | |
| 2004/0015992 A1 | 1/2004 | Hasegawa et al. | |
| 2004/0015999 A1 | 1/2004 | Carlucci et al. | |
| 2004/0078829 A1 | 4/2004 | Patel et al. | |
| 2004/0103428 A1 | 5/2004 | Seok et al. | |
| 2004/0128682 A1 | 7/2004 | Liga et al. | |
| 2004/0133923 A1 | 7/2004 | Watson et al. | |
| 2004/0162871 A1 | 8/2004 | Pabla et al. | |
| 2004/0218905 A1 | 11/2004 | Green et al. | |
| 2004/0242150 A1 | 12/2004 | Wright et al. | |
| 2004/0268387 A1 | 12/2004 | Wendling | |
| 2005/0002640 A1 | 1/2005 | Putterman | |
| 2005/0034171 A1 | 2/2005 | Benya | |
| 2005/0083865 A1 | 4/2005 | Ashley et al. | |
| 2005/0120049 A1 | 6/2005 | Kanegae et al. | |
| 2005/0125683 A1 | 6/2005 | Matsuyama et al. | |
| 2005/0147383 A1 | 7/2005 | Ihara | |
| 2005/0180568 A1 | 8/2005 | Krause | |
| 2005/0229213 A1 * | 10/2005 | Ellis et al. | 725/58 |
| 2005/0271365 A1 | 12/2005 | Hisatomi | |
| 2005/0273819 A1 | 12/2005 | Knudson et al. | |
| 2005/0281531 A1 | 12/2005 | Unmehopa | |
| 2006/0010464 A1 | 1/2006 | Azami | |
| 2006/0020962 A1 | 1/2006 | Stark et al. | |
| 2006/0056800 A1 | 3/2006 | Shimagami et al. | |
| 2006/0075434 A1 | 4/2006 | Chaney et al. | |
| 2006/0080716 A1 | 4/2006 | Nishikawa et al. | |
| 2006/0085828 A1 | 4/2006 | Dureau et al. | |
| 2006/0206819 A1 * | 9/2006 | Tsuji et al. | 715/716 |
| 2006/0212900 A1 | 9/2006 | Ismail et al. | |
| 2006/0215993 A1 * | 9/2006 | Yamada | 386/83 |
| 2006/0274208 A1 | 12/2006 | Pedlow, Jr. | |
| 2007/0016546 A1 | 1/2007 | De Vorchik et al. | |
| 2007/0039032 A1 | 2/2007 | Goldey et al. | |
| 2007/0061378 A1 | 3/2007 | Lee et al. | |
| 2007/0154163 A1 | 7/2007 | Cordray | |
| 2007/0157248 A1 | 7/2007 | Ellis | |
| 2007/0157253 A1 * | 7/2007 | Ellis et al. | 725/61 |

(56) References Cited

U.S. PATENT DOCUMENTS

| | | |
|---|---|---|
| 2007/0165855 A1 | 7/2007 | Inui |
| 2007/0183745 A1 | 8/2007 | White |
| 2007/0192586 A1 | 8/2007 | McNeely |
| 2007/0204288 A1 | 8/2007 | Candelore |
| 2007/0234395 A1 | 10/2007 | Dureau et al. |
| 2007/0250856 A1 | 10/2007 | Leavens et al. |
| 2007/0258596 A1 | 11/2007 | Kahn et al. |
| 2008/0022347 A1 | 1/2008 | Cohen |
| 2008/0044158 A1 | 2/2008 | Kido |
| 2008/0046929 A1* | 2/2008 | Cho et al. .................. 725/46 |
| 2008/0052743 A1 | 2/2008 | Moore |
| 2008/0074547 A1 | 3/2008 | Ida |
| 2008/0092164 A1 | 4/2008 | Agarwal et al. |
| 2008/0092181 A1 | 4/2008 | Britt |
| 2008/0101760 A1 | 5/2008 | Waller |
| 2008/0104534 A1 | 5/2008 | Park et al. |
| 2008/0127253 A1 | 5/2008 | Zhang et al. |
| 2008/0137850 A1 | 6/2008 | Mamidwar |
| 2008/0141322 A1 | 6/2008 | Jang et al. |
| 2008/0144747 A1 | 6/2008 | Tomizawa |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1* | 9/2008 | Pfeffer et al. .................. 725/100 |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0273856 A1 | 11/2008 | Bumgardner |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0025027 A1 | 1/2009 | Craner |
| 2009/0051579 A1 | 2/2009 | Inaba et al. |
| 2009/0067336 A1* | 3/2009 | Cho et al. .................. 370/238 |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0136206 A1 | 5/2009 | Aisu |
| 2009/0150941 A1 | 6/2009 | Riedl et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0210912 A1 | 8/2009 | Cholas et al. |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2009/0320084 A1 | 12/2009 | Azam et al. |
| 2009/0324203 A1 | 12/2009 | Wiklof |
| 2010/0020794 A1 | 1/2010 | Cholas et al. |
| 2010/0037282 A1 | 2/2010 | Iwata et al. |
| 2010/0043022 A1 | 2/2010 | Kaftan |
| 2010/0050225 A1 | 2/2010 | Bennett |
| 2010/0086277 A1 | 4/2010 | Craner |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0146581 A1 | 6/2010 | Erk |
| 2010/0158479 A1 | 6/2010 | Craner |
| 2010/0158480 A1 | 6/2010 | Jung et al. |
| 2010/0162285 A1 | 6/2010 | Cohen et al. |
| 2010/0169926 A1 | 7/2010 | Westberg et al. |
| 2010/0195827 A1 | 8/2010 | Lee et al. |
| 2010/0217613 A1 | 8/2010 | Kelly |
| 2010/0232604 A1 | 9/2010 | Eklund, II |
| 2010/0235862 A1 | 9/2010 | Adachi |
| 2010/0239228 A1 | 9/2010 | Sano |
| 2010/0242079 A1 | 9/2010 | Riedl et al. |
| 2010/0246582 A1 | 9/2010 | Salinger et al. |
| 2010/0247067 A1 | 9/2010 | Gratton |
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0265391 A1 | 10/2010 | Muramatsu et al. |
| 2010/0284537 A1 | 11/2010 | Inbar |
| 2010/0293583 A1 | 11/2010 | Loebig et al. |
| 2010/0299528 A1 | 11/2010 | Le Floch |
| 2010/0306401 A1 | 12/2010 | Gilson |
| 2010/0313222 A1 | 12/2010 | Lee et al. |
| 2010/0319037 A1 | 12/2010 | Kim |
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0080529 A1 | 4/2011 | Wong |
| 2011/0099364 A1* | 4/2011 | Robyr et al. .................. 713/150 |
| 2011/0131413 A1 | 6/2011 | Moon et al. |
| 2011/0138169 A1 | 6/2011 | Michel |
| 2011/0138424 A1 | 6/2011 | Vlot |
| 2011/0145854 A1 | 6/2011 | Bacon et al. |
| 2011/0150429 A1 | 6/2011 | Kaneko |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0235701 A1 | 9/2011 | Kim |
| 2011/0239249 A1 | 9/2011 | Murison et al. |
| 2011/0255002 A1 | 10/2011 | Witheiler |
| 2011/0286719 A1 | 11/2011 | Woods |
| 2011/0311045 A1 | 12/2011 | Candelore et al. |
| 2012/0183276 A1 | 7/2012 | Quan et al. |
| 2012/0198501 A1 | 8/2012 | Ruan et al. |
| 2012/0236933 A1 | 9/2012 | Saitoh |
| 2012/0278837 A1 | 11/2012 | Curtis et al. |
| 2012/0296745 A1 | 11/2012 | Harper et al. |
| 2012/0301104 A1* | 11/2012 | Dove .................. 386/239 |
| 2012/0311534 A1 | 12/2012 | Fox et al. |
| 2012/0311634 A1 | 12/2012 | Van Duyn et al. |
| 2012/0331505 A1 | 12/2012 | Chun et al. |
| 2013/0014146 A1 | 1/2013 | Bhatia et al. |
| 2013/0014159 A1 | 1/2013 | Wiser et al. |
| 2013/0051555 A1 | 2/2013 | March et al. |
| 2013/0051758 A1 | 2/2013 | Kummer et al. |
| 2013/0051764 A1 | 2/2013 | Casagrande |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | March et al. |
| 2013/0055310 A1 | 2/2013 | VanDuyn et al. |
| 2013/0055311 A1 | 2/2013 | Kirby et al. |
| 2013/0055314 A1 | 2/2013 | March |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | March |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | March et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0126889 A1 | 5/2014 | Kummer et al. |
| 2014/0130094 A1 | 5/2014 | Kirby et al. |
| 2014/0201767 A1 | 7/2014 | Seiden et al. |
| 2014/0341377 A1 | 11/2014 | Kummer et al. |

(56) References Cited

U.S. PATENT DOCUMENTS

| | | |
|---|---|---|
| 2014/0344858 A1 | 11/2014 | Minnick |
| 2014/0363139 A1 | 12/2014 | Kirby |
| 2015/0040166 A1 | 2/2015 | Tamura et al. |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Protrebic |
| 2015/0245113 A1 | 8/2015 | Casagrande |

FOREIGN PATENT DOCUMENTS

| | | |
|---|---|---|
| CN | 101 404 780 A | 4/2009 |
| CN | 101978690 A | 2/2011 |
| EP | 0 903 743 A | 3/1999 |
| EP | 0 973 333 A | 1/2000 |
| EP | 1 001 631 A1 | 5/2000 |
| EP | 1 168 347 A | 1/2002 |
| EP | 1372339 A2 | 12/2003 |
| EP | 1 447 983 A1 | 8/2004 |
| EP | 1 742 467 A2 | 1/2007 |
| EP | 2 018 059 A1 | 1/2009 |
| EP | 2 317 767 A1 | 5/2011 |
| EP | 2 357 563 A1 | 8/2011 |
| EP | 1 667 452 B1 | 11/2011 |
| EP | 2 403 239 A1 | 1/2012 |
| EP | 2 541 929 A1 | 1/2013 |
| IN | 9740/CHENP/2013 A | 9/2014 |
| JP | 2007 116525 A | 5/2007 |
| JP | 2010165058 A | 7/2010 |
| WO | 98/12872 A1 | 3/1998 |
| WO | 02/41625 A1 | 5/2002 |
| WO | 2004/057610 A1 | 7/2004 |
| WO | 2007/047410 A2 | 4/2007 |
| WO | 2008/010689 A1 | 1/2008 |
| WO | 2008/060486 A2 | 5/2008 |
| WO | 2011/027236 A1 | 3/2011 |
| WO | 2011/081729 A1 | 7/2011 |
| WO | 2012/003693 A1 | 1/2012 |
| WO | 2013/028824 A3 | 2/2013 |
| WO | 2013/028829 A2 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |

OTHER PUBLICATIONS

International Search Report and Written Opinion of PCT/US2012/51992 mailed Nov. 2, 2012, 15 pages.
International Search Report and Written Opinion of PCT/US2012/51987 mailed Oct. 23, 2012. 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Search Report and Written Opinion of PCT/US2012/51964 mailed Nov. 2, 2012, 13 pages.
U.S. Appl. No. 13/149,852, filed May 31, 2011, Non-Final Office Action mailed Dec. 12, 2012, 9 pages.
U.S. Appl. No. 13/215,916, filed Aug. 23, 2011 Notice of Allowance mailed Jan. 4, 2013.
U.S. Appl. No. 13/302,852, filed Nov. 22, 2011, Non-Final Rejection mailed May 23, 2013, 19 pages.
International Search Report and Written Opinion of PCT/US2012/052011 mailed Dec. 17, 2012, 44 pages.
Jung, J., et al., "Design and Implementation of a Multi-Stream CableCARD with a High-Speed DVB-Common Descrambler," ACM Multimedia, 2006, 4 pages.
U.S. Appl. No. 13/286,157, filed Oct. 31, 2011, Non-Final Office Action mailed Jan. 17, 2013, 20 pages.
U.S. Appl. No. 13/215,702, filed Aug. 23, 2011, Notice of Allowance mailed Feb. 11, 2013, 13 pages.
U.S. Appl. No. 13/324,831, filed Dec. 12, 2011 Non-Final Office Action mailed Feb. 28, 2013, 23 pages.
U.S. Appl. No. 13/614,899, filed Sep. 2012 Non-Final Office Action mailed Feb. 5, 2013, 17 pages.
U.S. Appl. No. 13/291,014, filed Nov. 7, 2011 Non-Final Office Action mailed Mar. 29, 2013, 21 pages.
U.S. Appl. No. 13/288,002, filed Nov. 2, 2011, Non-final Office Action mailed Sep. 26, 2013, 15 pages.
U.S. Appl. No. 13/324,831, filed Dec. 13, 2011 Notice of Allowance mailed Sep. 4, 2013, 22 pages.
U.S. Appl. No. 13/614,899, filed Sep. 13, 2012 Non-Final Office Action mailed Sep. 17, 2013, 17 pages.
U.S. Appl. No. 13/291,014, filed Nov. 7, 2011 Notice of Allowance mailed Aug. 7, 2013, 16 pages.
U.S. Appl. No. 13/215,598, filed Aug. 23, 2011 Non-Final Office Action mailed Jun. 20, 2013, 15 pages.
U.S. Appl. No. 13/215,655, filed Aug. 23, 2011 Non-Final Office Action mailed Sep. 6, 2013, 27 pages.
U.S. Appl. No. 13/294,005, filed Nov. 11, 2011 Non-Final Office Action mailed Aug. 14, 2013, 32 pages.
U.S. Appl. No. 13/592,976, filed Aug. 23, 2012 Notice of Allowance mailed Oct. 7, 2013, 18 pages.
U.S. Appl. No. 13/286,157, filed Oct. 31, 2011, Notice of Allowance mailed Feb. 3, 2014, 81 pages.
U.S. Appl. No. 13/614,899, filed Sep. 13, 2012, Final Office Action mailed Mar. 17, 2014, 41 pages.
U.S. Appl. No. 13/215,598, filed Aug. 23, 2011, Non-Final Office Action mailed Feb. 6, 2014, 12 pages.
U.S. Appl. No. 13/829,350, filed Mar. 14, 2013, Non Final Office Action mailed Feb. 28, 2014, 29 pages.
U.S. Appl. No. 13/799,719, filed Mar. 13, 2013, Non Final Office Action mailed Oct. 25, 2013, 79 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
International Search Report of PCT/KR2007/003521 mailed on Oct. 23, 2007, 22 pages.
International Search Report of PCT/IB2003/005737 mailed on Mar. 3, 2004, 21 pages.
Jensen, Craig, "Fragmentation: the condition, the cause, the cure" 'Online!, Executive Software International, 1994; ISBN: 0964004909; retrieved from Internet: <URL: www.executive.com/fragbook/fragbook.htm> * Chapter: "How a disk works", Section: "The original problem", Retrieved on Jan. 9, 2014, 70 pages.
U.S. Appl. No. 13/795,914, filed Mar. 6, 2013 Non-Final Office Action mailed Oct. 11, 2013, 17 pages.
International Search Report and Written Opinion of PCT/US2013/32176 mailed on Jun. 25, 2013, 15 pages.
International Search Report and Written Opinion of PCT/US2013/031565 mailed on May 31, 2013, 82 pages.
International Search Report and Written Opinion of PCT/US2013/031915 mailed on Jun. 3, 2013, 7 pages.
U.S. Appl. No. 13/294,005, filed Nov. 11, 2011 Final Office Action mailed Jan. 3, 2014, 29 pages.
U.S. Appl. No. 13/215,655, filed Aug. 23, 2011 Final Office Action mailed Dec. 18, 2013, 20 pages.
U.S. Appl. No. 13/302,852, filed Nov. 22, 2011, Final Rejection mailed Dec. 9, 2013, 23 pages.
U.S. Appl. No. 13/215,598, filed Aug 23, 2011 Final Office Action mailed Nov. 21, 2013, 23 pages.
U.S. Appl. No. 13/286,157, filed Oct. 31, 2011 Non-Final Office Action mailed Jul. 25, 2013. 49 pages.
U.S. Appl. No. 13/149,852, filed May 31, 2011, Notice of Allowance mailed Jul. 11, 2013, 13 pages.
U.S. Appl. No. 13/149,852, filed May 31, 2011, Final Office Action mailed Mar. 26, 2013, 13 pages.
International Search Report and Written Opinion of PCT/US2013/031432 mailed May 28, 2013, 10 pages.

(56) References Cited

OTHER PUBLICATIONS

International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
U.S. Appl. No. 13/302,852, filed Nov. 22, 2011 Non-Final Rejection mailed Sep. 2, 2014, 28 pages.
U.S. Appl. No. 13/793,636, filed Mar. 11, 2013 Non-Final Office Action mailed Sep. 29, 2014, 27 pages.
U.S. Appl. No. 13/800,477, filed Mar. 13, 2013 Non-Final Office Action mailed Sep. 11, 2014, 34 pages.
International Preliminary Report on Patentability for PCT/US2012/052002 mailed on Apr. 17, 2014, 10 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
U.S. Appl. No. 13/288,002, filed Nov. 2, 2011, Final Office Action mailed Mar. 27, 2014, 20 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Notice of Allowance mailed Apr. 23, 2014, 141 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug. 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
Author Unknown, "EE Launches home TV service in UK," dated Oct. 8, 2014, 3 pages. Retrieved on Oct. 13, 2014 from http://www.bbc.com/news/technology-29535279.
Author Unknown, "EE TV It's simply great television," Accessed on Oct. 13, 2014, 11 pages. Retrieved from https//ee.co.uk/ee-and-me/ee-tv.
Extended European Search Report for EP 12825080 mailed Sep. 11, 2014, 10 pages.
Extended European Search Report for EP 12825521 mailed Nov. 24, 2014, 7 pages.
International Search Report and Written Opinion of PCT/US2013/031440 mailed May 30, 2013, 14 pages.
International Preliminary Report on Patentability for PCT/US2013/031440 mailed Sep. 25, 2014, 8 pages.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
The Office Action dated Nov. 6, 2014 for Mexican Patent Application No. MX/a/2013/014677 is not translated into English. This document is from prosecution of the corresponding foreign matter for which we do not have a translation, 2 pages.
U.S. Appl. No. 13/856,752, filed Apr. 4, 2013, Non Final Office Action mailed Nov. 5, 2014, 34 pages.
U.S. Appl. No. 13/757,168, filed Feb. 1, 2013, Notice of Allowance mailed Oct. 14, 2014, 28 pages.
U.S. Appl. No. 13/215,598, filed Aug. 23, 2011, Non-Final Office Action mailed Nov. 25, 2014, 18 pages.
U.S. Appl. No. 13/294,005, filed Nov. 1, 2011, Notice of Allowance mailed Oct. 31, 2014, 24 pages.
U.S. Appl. No. 13/797,173, filed Mar. 12, 2013, Notice of Allowance mailed Nov. 24, 2014, 37 pages.
U.S. Appl. No. 13/799,653, filed Mar. 13, 2013, Notice of Allowance mailed Nov. 26, 2014, 32 pages.
U.S. Appl. No. 14/095,860, filed Dec. 3, 2013 Non-Final Office Action mailed Dec. 26, 2014, 45 pages.
U.S. Appl. No. 14/043,617, filed Oct. 1, 2013 Non-Final Office Action mailed Jan. 5, 2015, 45 pages.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
U.S. Appl. No. 13/888,012, filed May 6, 2013 Non-Final Rejection mailed Apr. 6, 2015, 36 pages.
U.S. Appl. No. 13/856,752, filed Apr. 4, 2013 Notice of Allowance mailed Feb. 10, 2015, 20 pages.
U.S. Appl. No. 13/799,604, filed Mar. 13, 2013, Final Office Action mailed Jan. 14, 2015, 36 pages.
U.S. Appl. No. 13/302,852, filed Nov. 22, 2011, Final Rejection mailed Mar. 30, 2015, 29 pages.
U.S. Appl. No. 13/614,899, filed Sep. 13, 2012, Notice of Allowance mailed Mar. 13, 2015, 35 pages.
U.S. Appl. No. 13/797,173, filed Mar. 12, 2013, Notice of Allowance mailed Feb. 26, 2015, 19 pages.
U.S. Appl. No. 13/829,350, filed Mar. 14, 2013 Final Office Action mailed Jan. 23, 2015, 18 pages.
U.S. Appl. No. 13/793,636, filed Mar. 11, 2013, Notice of Allowance mailed Jan. 28, 2015, 43 pages.
U.S. Appl. No. 13/800,477, filed Mar. 13, 2013 Notice of Allowance mailed Feb. 18, 2015, 18 pages.
U.S. Appl. No. 14/060,388, filed Oct. 22, 2013, Notice of Allowance mailed Apr. 13, 2015, 44 pages.
U.S. Appl. No. 14/095,860, filed Dec. 3, 2013 Final Office Action mailed May 1, 2015, 18 pages.
U.S. Appl. No. 13/215,598, filed Aug. 23, 2011 Final Office Action mailed May 5, 2015, 17 pages.
European Search Report for EP 12825653 dated Mar. 11, 2015, 7 pages.
Extended European Search Report for EP 12825474 mailed Jan. 7, 2015, 6 pages.
Extended European Search Report for EP 12825430 mailed Feb. 3, 2015, 9 pages.
Supplementary European Search Report for Application No. EP 12825147 dated Mar. 27, 2015, 9 pages.
The Office Action dated Feb. 26, 2015 for Mexican Patent Application. No. MX/a/2013/014217 is not translated into English, 3 pages.
The Office Action dated Feb. 20, 2015 for Mexican Patent Application No. MX/2013/014907 is a Notice of Allowance and is not translated into English, 1 page.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.

(56) References Cited

OTHER PUBLICATIONS

The Notice of Allowance by the Mexican Institute of Industrial Property for Mexican Patent Application No. MX/a/2013/014677 dated Mar. 19, 2015 is not translated into English, 1 page.
U.S. Appl. No. 13/801,968, filed Mar. 13, 2013 Non Final Office Action mailed May 21, 2015, 49 pages.
The Notice of Allowance by the Mexican Institute of Industrial Property for Mexican Patent Application No. MX/a/2013/014671 dated Apr. 17, 2015, 1 page.
U.S. Appl. No. 13/799,604, filed Mar. 13, 2013, Notice of Allowance mailed May 29, 2015, 46 pages.
Extended European Search Report for EP 13760237.1 received Jul. 21, 2015, 8 pages.
First Office Action and Search Report from the State Intellectual Property Office (SIPO) for CN 201280031434.7, issued Jul. 17, 2015, 12 pages.
Office Action dated Jul. 31, 2015 for Mexican Patent Application No. MX/a/2014/009928, 2 pages.
U.S. Appl. No. 14/340,190, filed Jul. 24, 2014, Non-Final Rejection mailed Aug. 31, 2015, 74 pages.
U.S. Appl. No. 13/799,604, filed Mar. 13, 2013, Notice of Allowance mailed Jul. 24, 2015, 34 pages.
U.S. Appl. No. 14/467,959, filed Aug. 25, 2014 Notice of Allowance mailed Jun. 22, 2015, 36 pages.
U.S. Appl. No. 14/095,860, filed Dec. 3, 2013 Notice of Allowance mailed Jul. 13, 2015, 31 pages.
U.S. Appl. No. 13/888,012, filed May 6, 2013 Notice of Allowance mailed Jul. 14, 2015, 18 pages.
U.S. Appl. No. 13/302,852, filed Nov. 22, 2011 Notice of Allowance mailed Jun. 19, 2015, 26 pages.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
U.S. Appl. No. 14/154,887, filed Jan. 14, 2014 Non-Final Rejection mailed Jul. 17, 2015, 33 pages.
U.S. Appl. No. 13/288,002, filed Nov. 2, 2011 Non Final Rejection mailed Jul. 28, 2015, 29 pages.
U.S. Appl. No. 13/829,350, filed Mar. 14, 2013 Notice of Allowance mailed Jul. 24, 2015, 29 pages.
U.S. Appl. No. 14/043,617, filed Oct. 1, 2013 Final Office Action mailed Jul. 16, 2015, 45 pages.
Supplementary European Search Report for EP 13761291.7 mailed Jul. 9, 2015, 8 pages.
U.S. Appl. No. 13/786,915, filed Mar. 6, 2013 Non Final Rejection mailed Oct. 15, 2015, 59 pages.
U.S. Appl. No. 14/095,860, filed Dec. 3, 2013 Notice of Allowance mailed Oct. 19, 2015, 14 pages.
U.S. Appl. No. 14/338,114, filed Jul. 22, 2014 Non-Final Office Action mailed Sep. 30, 2015, all pages.
U.S. Appl. No. 14/529,989, filed Oct. 31, 2014 Non-Final Office Action mailed Nov. 4, 2015, all pages.
U.S. Appl. No. 13/801,994 Non Final Office Action mailed Oct. 7, 2015, 55 pages.
U.S. Appl. No. 14/043,617, filed Oct. 1, 2013 Non-Final Office Action mailed Oct. 23, 2015, all pages.
U.S. Appl. No. 14/676,137, filed Apr. 1, 2015 Notice of Allowance mailed Sep. 28, 2015, 35 pages.
Supplementary European Search Report for EP 13760902 mailed Oct. 20, 2015, all pages.
Supplementary European Search Report for EP 13761427 mailed Oct. 19, 2015, all pages.
Office Action dated Jul. 31, 2015 for Mexican Patent Application No. MX/a/2014/009919, 2 pages.
Second Office Action for CN 201280031434.7, issued Dec. 23, 2015, 6 pages.
First Office Action issued by State Intellectual Property Office (SIPO) for CN 201280028697.2, issued Dec. 16, 2015, 11 pages.
Notice of Allowance received for Mexican Patent Appln. MX/a/2013/014991, mailed on Dec. 9, 2015, 1 page.
Notice of Allowance mailed Dec. 4, 2015 for Mexican Patent Application No. MX/a/2014/009723, 1 page.
U.S. Appl. No. 14/340,190, filed Jul. 24, 2014, Final Rejection mailed Feb. 19, 2016, 54 pages.
U.S. Appl. No. 14/154,887, filed Jan. 14, 2014 Notice of Allowance mailed Jan. 21, 2016, 26 pages.
U.S. Appl. No. 13/288,002, filed Nov. 2, 2011 Final Rejection mailed Jan. 13, 2016, 22 pages.
U.S. Appl. No. 13/215,598, filed Aug 23, 2011 Non Final Office Action mailed Dec. 15, 2015, all pages.
U.S. Appl. No. 14/589,090, Notice of Allowance mailed Feb. 9, 2016, 47 pages.
U.S. Appl. No. 14/591,549, Non Final Office Action mailed Dec. 31, 2015, 19 pages.
U.S. Appl. No. 14/338,114, filed Jul. 22, 2014 Notice of Allowance mailed Feb. 3, 2016, all pages.

* cited by examiner

| CHANNEL # | 7:00 PM | 7:30 PM | 8:00 PM | 8:30 PM | 9:00 PM | 9:30 PM | 10:00 PM |
|---|---|---|---|---|---|---|---|
| 1 | TITLE 1 — 306<br>DESCRIPTOR<br>EPISODE 8 — 308 | | TITLE 2<br>DESCRIPTOR<br>EPISODE # | TITLE 3<br>DESCRIPTOR<br>EPISODE # | TITLE 4<br>DESCRIPTOR<br>EPISODE # | | TITLE 1<br>DESCRIPTOR<br>EPISODE 4 |

FIG.3

GROUPING AND PRESENTING CONTENT

CROSS REFERENCE TO RELATED APPLICATION

The present application claims the benefit under 35 U.S.C. §119(e) of U.S. Provisional Patent Application No. 61/526,506, which was filed on Aug. 23, 2011, and entitled "Grouping and Presenting Content," which is incorporated by reference into the present application in its entirety.

FIELD OF THE INVENTION

This disclosure relates generally to content receivers, and more specifically to presenting content from a content receiver.

BACKGROUND

Audio/visual recorders for broadcast content, e.g., television shows, may include a digital video disc burner or digital video recorder. These recorders may be programmed to record various broadcast content and store the content as the content is broadcast. These recorders may not provide a way to link content together or present content in an order other than the order it was recorded.

SUMMARY

The present disclosure discloses systems and methods content presentation. In one example, a content provider transmits instructions to a content receiver to record multiple instances of content. The instances of content are included in the same frequency band of a broadcast signal transmitted by the content provider via a first communication link and encoded utilizing a common encryption. The content provider determines to supplement the multiple instances of content and transmits an instruction to record a supplemental instance of content from a second content provider via a second communication link. The content receiver receives the instructions and accordingly receives, decodes, and stores the multiple instances of content and the supplemental instance of content. A digital video recorder in communication with the content receiver determines whether a content selection by a user is a member of a content group. The group determination is based on a tag of the content selection. If the content selection is a member of the content group, the digital video recorder presents to a display device the content selection and at least one other member of the content group.

In various implementations, a method of presenting content stored on a content receiver is disclosed. The method may include receiving, at a content receiver a plurality of instructions to simultaneously record a plurality of instances of content each of the plurality of instances corresponding to a separate content provider. After the content has been received, the method may include recording, utilizing the content receiver, at least one of the plurality of instances of content via the least one first communication link as specified by the plurality of instructions. Then, receiving a content selection at an input to the content receiver and determining at the content receiver whether the content selection is a member of a group. If the content selected is a member of the group, the method may include presenting at least a first content member and a second content member of the group in a predetermined order corresponding to an episode identifier.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIG. 3 is a diagram illustrating a first example of an electronic programming guide that may be provided by the system of FIG. 1.

DETAILED DESCRIPTION OF THE EMBODIMENTS

Figure 1:
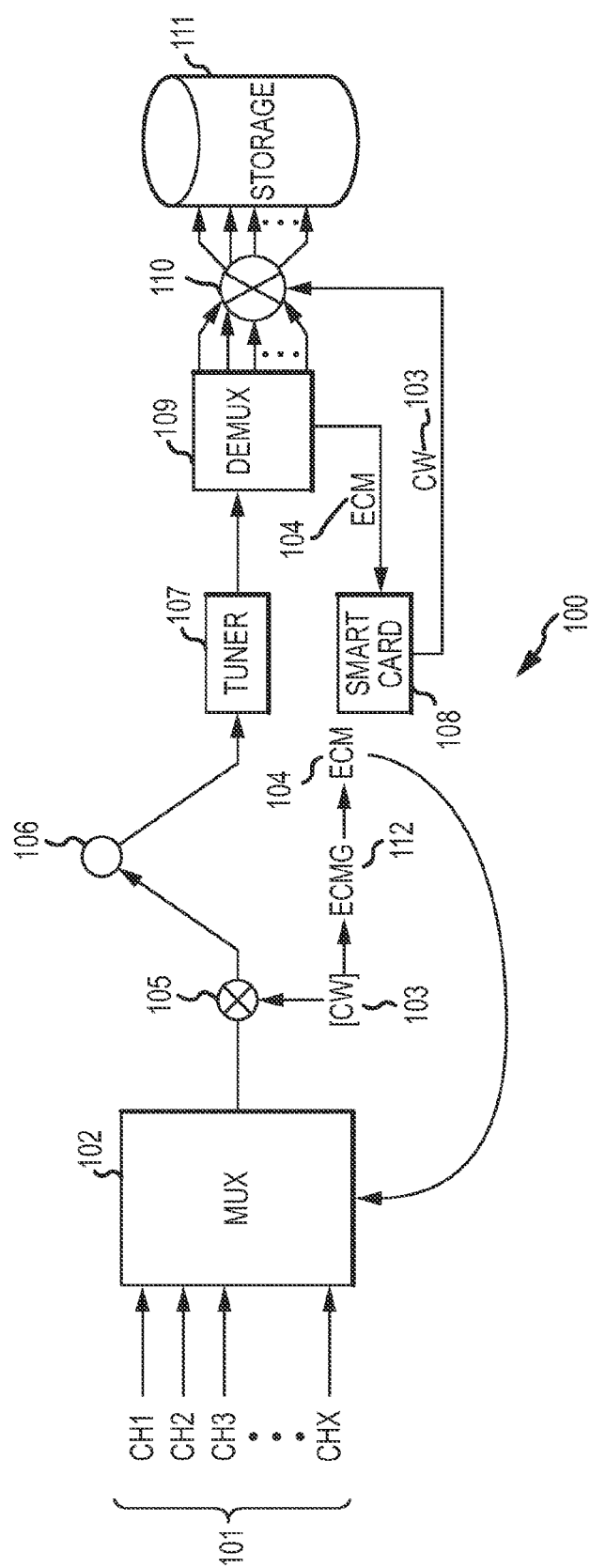
FIG. 1 is a block diagram illustrating a system for automatically recording multiple instances of content from one or more programming providers.

The description that follows includes sample systems, methods, and computer program products that embody various elements of the present disclosure. However, it should be understood that the described disclosure may be practiced in a variety of forms in addition to those described herein.

Content receivers (such as set top boxes, television receivers, digital video recorders, and so on) generally receive content from one or more programming providers (such as satellite television programming providers, cable television programming providers, Internet service providers, video on demand providers, pay-per-view movie providers, and so on) via one or more communication connections (such as satellite communication connections, coaxial cable communication connections, Internet communication connections, radio-frequency connections, and so on). Such content receivers may transmit such received content to one or more presentation devices and/or store the received content for later presentation.

When a user is viewing content previously stored on the content receiver, the user may wish to view the content according to a specific group. For example, the user may wish to view content recordings in the order that the content was originally presented. This may include a variety of different content selections that may have been originally presented on a single channel during a particular time frame. In one example, a user may wish to view all of the content originally broadcast during a primetime channel slot, on a particular channel. Current digital video recorders (DVRs) may store content by its name. Therefore, if a user wished to watch all of the content presented on a particular channel from the time of 7 pm to 10 pm, he or she would have to select each specific content (by varying names) in order to cause the DVR to present the content. Similarly, DVRs may store content based on the name and the originally broadcast date. For example, a user may wish to record content that may be a rerun of previously aired content that may be displayed on multiple channels in a random or non-chronological order. The DVR may be configured to record each content. However, the user may wish to view the content by original episode number (rather than recorded or broadcast date).

The present disclosure discloses systems and methods for grouping, recording, and/or presenting content. The content (e.g., television shows) may be grouped together based on the originally broadcast time, date, and/or channel, or based on a episode number, title, descriptor, or the like. As the content may be grouped, a user may select multiple different content to be displayed continuously. For example, the user may wish to view the content chronologically as it was originally aired on a particular channel and the content receiver may display the content in the particular order it was originally aired. In this example, content may be arranged to be displayed after one another, based on the original airing sequence, e.g., content that aired at 7 pm may be presented prior to content that aired at 7:30 pm, and so on.

In another example, the grouping or relationship may be related to an episode and/or title of a particular content. When a user selects a particular content to watch, the content may be presented based on an episode number, which may be out of order from how the content was originally recorded. For example, syndicated content may broadcast different episodes of a particular content series out of episode order. Therefore, by presenting the content based on an episode (or title) order, a user may watch all of the episodes for a particular show episodically, although the show may not have been recorded in that manner.

Users of content receivers may desire to access different instances of content that may be broadcast simultaneously and/or substantially contemporaneously by content providers. For example, many television programming viewers wish to watch different television programs that occupy the same broadcast time slot, such as the different television programs associated with the major television programs that are broadcast between 7 PM and 10 PM mountain standard time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the programs may include multiple PIDs (packet identifiers), such as a video PID and one or more audio PIDs for a particular instance of content. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels, such as by utilizing a PID filter to keep data identified by PIDs related to the particular programming channel and discard data identified by PIDs not related to that particular programming channel. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "prime-time events" associated with all channels defined as "prime-time television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM by an ECM generator 112 which may take the CW as an input (and may also include other information such as access criteria) and outputs the ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency (which may be filtered by a PID filter, not shown) may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the CW prior to multiplexing. In another example, in some implementations, the data received via the tuned frequency may be demultiplexed before being individually descrambled utilizing the CW.

In some implementations of the system of FIG. 1, multiple instances of content may be recorded simultaneously from a single transponder and stored in the non-transitory storage medium 111 of the content receiver as a single file of multiple recorded instances of content. Upon playing of one instance of content from the single file of the multiple recorded instances of content, the content receiver may read the file incrementally so as to play the one instance of content while filtering out the other file contents (e.g., the other instance of content within the file).

Figure 2:
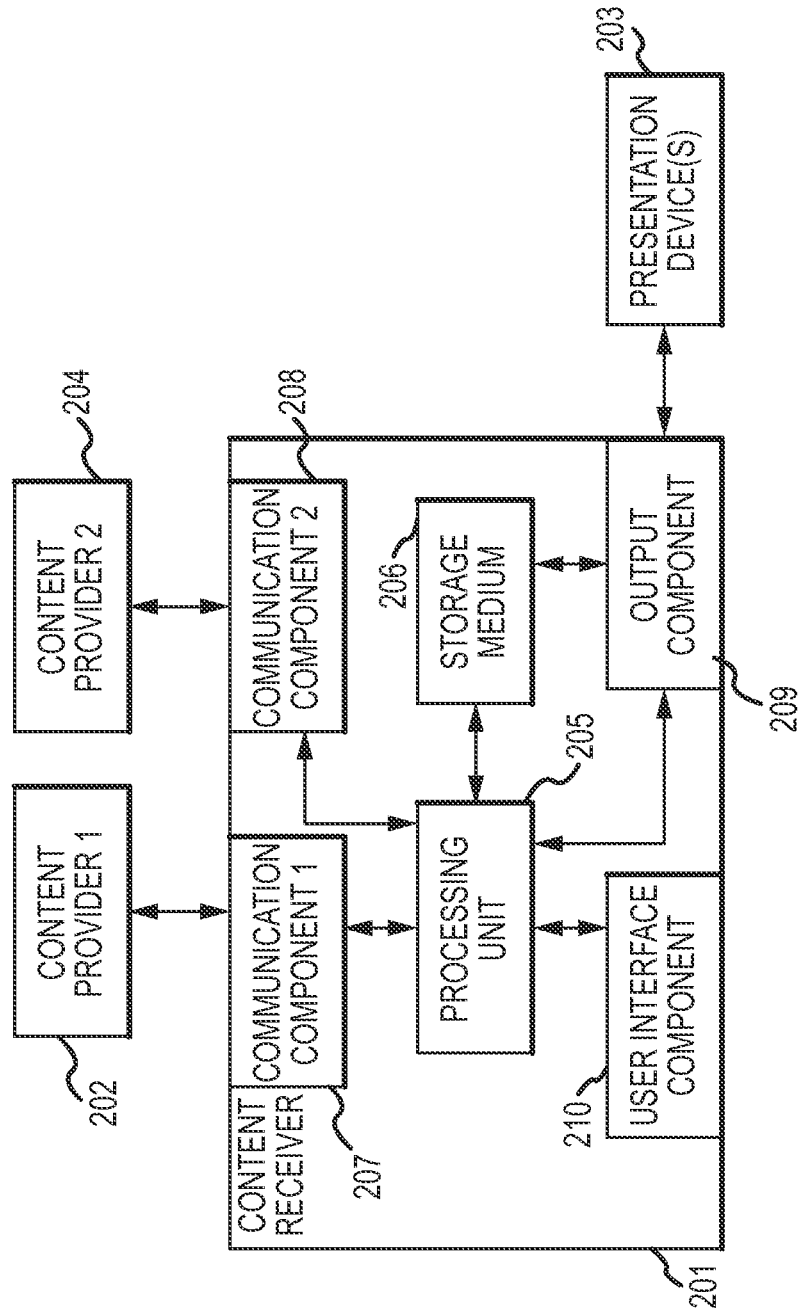
FIG. 2 is a block diagram illustrating a system for providing electronic programming guides that combine stored content information with content provider schedule information.

FIG. 2 is a block diagram illustrating a system 200 for grouping, recording, and/or presenting content. The system 200 includes a content receiver 201 which may be a set top box, a television receiver, a digital video recorder, a digital music player, a desktop computer, a laptop computer, a tablet computer, a mobile computer, a cellular telephone, a smart phone, and/or any other electronic device that is able to receive and/or provide received content. The system 200 may also include one or more content providers 202 (such as one or more satellite television programming providers, cable television programming providers, Internet service providers, video on demand providers, pay-per-view movie providers, and/or other entities that are configured to transmit instances of content to the content receiver) and/or one or more presentation devices 203 (such as one or more cathode ray tube displays, computer monitors, liquid crystal displays, televisions, speakers, and/or other devices configured to present instances of content transmitted by the content receiver).

The content receiver 201 may include one or more processing units 204 (which may perform functions and/or include components (not shown) that perform functions corresponding to the smart card 108, the descrambler 109, and/or the demultiplexer 109 of FIG. 1), one or more non-transitory storage media 205, one or more communication components 206 (which may include, but is not limited to, the tuner 107 of FIG. 1), one or more output components 207, and one or more user interface components 208.

The processing unit 204 may execute instructions stored in the non-transitory storage medium 205 to receive one or more instances of content, instructions to record such instances of content, and/or EPG data from the content provider 202 via one or more communication links (such as one or more satellite communication connections, coaxial cable communication connections, Internet communication connections, radio-frequency connections, and/or other communication links) utilizing the communication component and/or store such content in the non-transitory storage medium (which may be at the direction of one or more instructions received from the content provider that specify to record received instances of content).

The processing unit 204 may also execute instructions stored in the non-transitory storage medium 205 to transmit instances of content received from the content provider 202 and/or stored in the non-transitory storage medium to the presentation device 203 utilizing the output component. In one or more cases, the processing unit may execute the instructions described above in response to one or more user instructions received from one or more user input/output devices (not shown) (such as one or more remote control devices, touch screens, buttons, keyboards, mice, and/or other input/output devices) via the user interface component 208.

Additionally, the processing unit 204 may execute instructions stored in the non-transitory storage medium 205 to transmit one or more EPGs to the presentation device 203 via the output component 207 (which may be performed in response to one or more user instructions received via the user interface component 208). The EPG may include schedule information for one or more instances of content accessible by the content receiver 201 from the content provider 202. The schedule information for the instances of content may be configured in the EPG as slots in a grid arranged by time associated with the respective instance of content and source (such as channel) associated with the respective instance of content. In some cases, the EPG may include one or more additional information fields that may present additional information regarding an instance of content (such as a program description and other program information for a television program) when user selection of a slot corresponding to the instance of content is received via the user interface component 208.

The processing unit 204 may determine whether or not one or more instances of recorded content are stored in the non-transitory storage medium 205. If so, the processing may incorporate content information for one or more of the instances of recorded content in the EPG. The content information that the processing unit incorporates in the EPG may include, but is not limited to, one or more portions of the instance of recorded content such as one or more images and/or one or more video segments and/or one or more images and/or video segments related to the instance of recorded content. The processing unit may obtain the portion of the instance of content and/or the image or video segment related to the instance of recorded content (such where the instance of content is an episode of a television series and the processing unit obtains an image from a future episode) to include in the content information by processing the instance of content stored in the non-transitory storage medium and/or by receiving images and/or video segments from the content provider.

In some implementations, the processing unit 204 may be configured to always include content information for one or more instances of recorded content when such instances of recorded content are stored in the non-transitory storage medium 205. For example, the processing unit may include a field in the EPG that includes content information for each of the instances of recorded content stored in the non-transitory storage medium. In other implementations, the processing unit may provide an EPG that does not include such content information and may incorporate the content information after receiving a user selection of one of more slots of the EPG via the user interface component 208. The content information incorporated in response to the user selection of the slot may correspond to one or more recorded instances of content stored in the non-transitory storage medium that are associated with the instance of content that corresponds to the slot.

Regardless of whether the processing unit 204 incorporates the content information prior to user input or in response to user input, the processing unit may be configured to perform one or more actions in response to receiving a user selection of the content information incorporated into the EPG. For example, in some implementations the processing unit may incorporate additional information related to the instance of recorded content corresponding to the selected content information into the EPG. Such additional information may include, but is not limited to, descriptions of the instance of content, ratings of the instance of content, information about the number of related instances of content are stored on the non-transitory storage medium 205 (such as where the instance of content is an episode of a particular television series and the additional information includes the number of episodes of that particular television series that are stored in the non-transitory storage medium), and/or other such information related to the particular instance of content. By way of another example, in some implementations the processing unit may be configured to access an instance of content that corresponds to the selected content information from the non-transitory storage medium.

In various implementations, the instances of recorded content for which the processing unit 204 incorporates content information in the EPG may be the multiple instances of content 101 selected to be automatically recorded as illustrated in FIG. 1 and described above. The content receiver 201 may have automatically recorded the multiple instances of content 101 in response to receiving instructions to record the multiple instances of content 101 from the content provider 202. When providing the EPG, the processing unit may include content information for each of the multiple instances of content 101. In various other implementations, the instances of recorded content for which the processing unit 204 incorporates content information in the EPG may be instances of content which the processing unit has recorded in response to user input received via the user interface component 208 such as recorded broadcast content, recorded video on demand content, recorded pay-per-view content, and so on.

FIG. 3 is a diagram of an example EPG programming that may be generated by the processing unit 204 of the content receiver 201. The EPG 300 may be display data 302 related to content, which in this example is audio visual programming content. The data 302 may vary depending on the content. For example, the EPG 300 may include information relating to content that may be presented at a variety of different time slots, e.g., from 7 pm to 10 pm. The data 302 for each time slot may vary, as the content varies. The data 302 may include a title 306, an episode identifier 308, a description 310, and so on. It should be noted that the data 302 may be displayed on the EPG 300 and/or may be included or attached to the content (e.g., as metadata associated with the content). As such, the depiction of the EPG 300 is merely exemplary and is not meant to be limiting (and in some instances may not be needed).

The data 302 may vary for each selected content. For example, different content instances may include the same title 306, but the episode identifier 308 may be varied. Continuing the example, data 302 for the first content listed in the EPG 300 may have the same title 306 as the content 318 listed for the 10 pm time slot, but the episode numbers 308, 320 may be different. Both instances of the content may be instances of a television show or series, and thus may have the same title, but may be different episodes of the same show, e.g., episode 1 and episode 4. The episode identifier 308, 320 may be used to indicate the order of the particular content with respect to an entire season and/or series of the content.

The episode identifier 308, 320 allows instances where the content may be re-run, syndicated, or otherwise presented at different times and dates to be related to the original presentation order. The episode identifier 308, 320 may allow a user watching instances of a particular content series to determine if he or she is viewing the instance in the original presentation order or in another order. Similarly, the description 310 may provide a user with substantially any desired information with respect to the content, e.g., actors that may be in the content, a description of the content episode, and so on.

It should be noted that the data 302 for each content may further include the time slot 304 and/or date in which the content is (or was) presented. This may allow the content receiver 201 (or other unit) to determine when the content was originally presented, which may allow the content receiver 201 to replay the content in the original presentation order (e.g., chronological and/or series). This is discussed in more detail below with respect to FIG. 5. Furthermore, it should be noted that the data 302 may include multiple other types of information and/or may vary based on the type of content. Therefore, the different data 302 categories listed are meant to be exemplary and not limiting.

Figure 4:
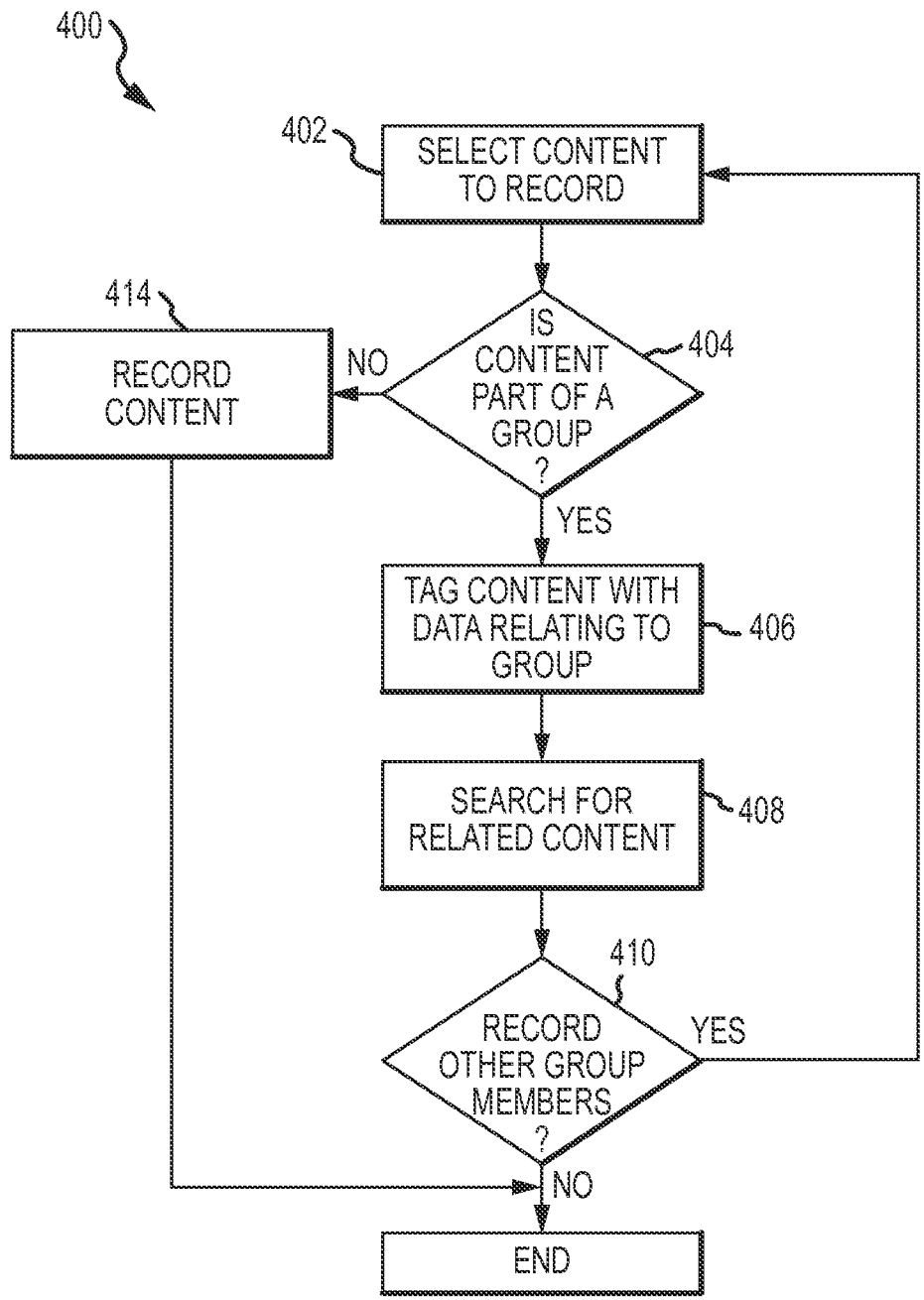
FIG. 4 is a flow chart illustrating a method of grouping and recording content.

FIG. 4 is a flow diagram illustrating a method 400 for grouping content. The method 400 may begin with operation 402 in which content is selected to be recorded. Operation 402 may be completed by a user providing input to the content receiver 201 indicating that he or she wishes to record or store an additional content, or the content may be selected by the content receiver 201. For example, as shown in FIGS. 1 and 2, the content receiver 201 may record content corresponding to a selected time slot or series of time slots, e.g., "primetime." Once particular content is selected to be recorded, the method 400 may proceed to operation 414. In operation 414 the content receiver 201 records the content. In some instances, the content may be automatically recorded, without requiring an input by the user.

Once the content is recorded, the method 400 proceeds to operation 404. Operation 404 determines whether the selected content is part of a group. The group may be defined by substantially any type of criteria, e.g., title 306, episode identifier 308, time slot 304, description 310, channel and so on. Furthermore, the group may correspond to a user input, e.g., content related to historical shows, sports, home and garden, and so on. If the content is not part of a group, but rather a discrete content selection, the method 400 may proceed to operation 404 and the selected content may be recorded, e.g., by the content receiver 201. If, however, the content is part of a group, the method 400 may proceed to operation 406.

Operation 406 may tag the content with data relating to the group. It should be noted that in some instances the content may be already tagged with the selected data, e.g., data 302 may provide sufficient information (title 306, episode identifier 308, description 310, time slot 304) to group the content or relate the content to other content. However, in other instances, the grouping may be selected by the user or the content receiver 201 (e.g., all content for a group of time slots 304). Therefore, the content receiver 201 may tag (or additionally tag) the content with the data relating to its particular group.

The content receiver 201 may tag the content with data relating to the group by inserting metadata into the electronic file storing the content, by changing another characteristic of an electronic file of the content, or the like. Additionally or alternatively, the content may be tagged with data relating the group and may also be indexed by the content receiver 201. Once the content is tagged, the method 400 may proceed to operation 408.

Operation 410 may search for related content, e.g., by scanning the data 302 provided for each content, and may then return to operation 402. The relatedness of content may be determined by similar data 302, such as the same title 306, broadcast channel, descriptor 310, or the like. Operation 410 may be performed by scanning or searching already recorded content on the content receiver 201, currently broadcasted content, and/or content presented on the EPG that may be broadcast in the future.

Operation 408 determines whether the other group members should be recorded. In one example, the content receiver 201 may be configured to present an option to the user on whether he or she wishes to record the related content. In another example, the content receiver 201 may make a determination (based on the type of group, whether the other content has been previously recorded, and so on), whether the other content should be recorded. If, in operation 408 the other group members are to be recorded, the method 400 may proceed to operation 410. If the content is to be recorded, the method 400 may return to operation 402, so that the method 400 may repeat until all related, available and/or desired content may be recorded.

As briefly described above, the method 400 illustrated in FIG. 4 is merely one option of tagging content and/or grouping content together. In some instances, the content may be grouped together based on the data 302 provided and/or displayed in the EPG 300. Similarly, the method 400 of FIG. 4 may be used to enhance or add to the data 302 provided in the EPG 300, e.g., based on user's preferences, and the like.

Figure 5:
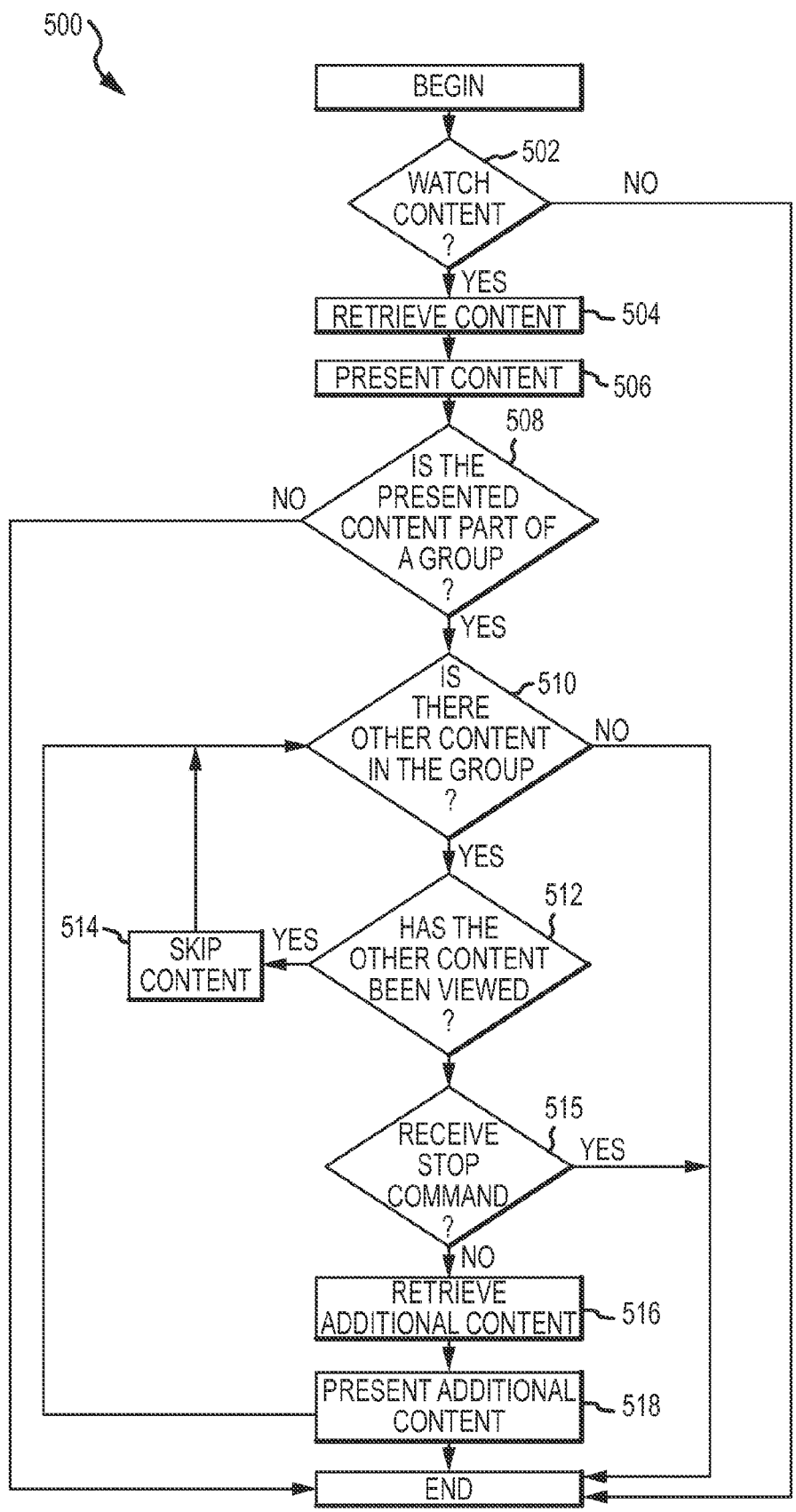
FIG. 5 is a flow chart illustrating a method of presenting related content.

FIG. 5 is a flow chart illustrating a method for displaying, recording and/or presenting content. The method 500 may be configured to selectively present content depending on whether the content is part of a group, or otherwise related to other content. The method 500 may begin with operation 502 which determines whether a group of content should be presented. For example, the content receiver 201 may present an option to a user to watch a select content/group of content, a user may select a content to watch, or the like. If the group of content is not selected to be viewed, the method 500 may proceed to operation 509 and the single instance of content may be presented. For example, the user may select a particular content and then the method 500 may present whether the user may wish to view the entire group of content. However, in some instances the user may wish to only view a particular content instance and therefore in operation 509, only the single content instance may be played.

If in operation 502 the group of content is selected to be watched, the method 500 may proceed to operation 504 and the content may be retrieved. For example, the content may be stored by the content receiver 201 as part of a block storage of particular time slots 304 and/or may be stored separately as a discrete recording or other type of storage within the content receiver 201 (e.g., a series specifically selected by the user to be recorded).

Once the content is retrieved, the method 500 may proceed to operation 506, and the content may be presented. The content receiver 201 may communicate the content to a display device, such as a television, or the content receiver 201 itself may present the content, and so on. After or as the content is being presented, the method 500 may proceed to operation 507 and the content may be tagged as being viewed. For example, the content receiver 201 may place a metadata tag on the content indicating that the content has been viewed at least once.

After the content has been presented and tagged as being viewed, the method 500 may proceed to operation 508. Operation 508 determines whether the content is part of a group. As described above with respect to FIG. 4, the content may be selectively tagged with data that may indicate membership in a group or another relationship between selected content. The group may be determined by the time slot 304 that the content was originally presented. For example, content displayed in the time slots 304 corresponding to 7 pm to 10 pm may be grouped together as the primetime slots for a particular day. In another example, the content may be selectively grouped together based on the title of the content, e.g., each episode of a particular television show may be grouped together as belonging to a group corresponding to the television show. In still another example, the content may be grouped together based on the episode identifier 308. If the content is not part of a group, the method 500 may end, but if the content is part of a group the method 500 may proceed to operation 510.

Operation 510 determines whether there is other content within the group. Operation 510 may determine whether there is other content recorded on the content receiver 201. For example, the content receiver 201 may utilize a lookup table or other index to determine content relationships, and if a particular content instance is a member of a group. In another example, the content may include a forward pointer and/or a backward pointer to indicate a relationship with other content, e.g., a forward pointer indicating the prior content and a backward pointer indicating a following content. In some instances, every content recording may be stored in a different file for a particular section of time slots. For example, every content instance from 7 pm to 10 pm for a particular day may be stored in a single electronic file on the content receiver 201. In these instances, the file may include metadata or other indicators separating each separate content instance. In other instances, the content may be stored in separate electronic files. In either instance, the content receiver 201 may determine (e.g., by searching, indexing, or the like), if there is other content in the group.

If there is other content in the group, in one embodiment, the method may proceed to optional operation 512. Optional operation 512 determines whether the other content has been viewed. For example, a user may have already viewed a selected time slot 304 and/or episode of a selected content. In this example, the method 500 may proceed to operation 512 and the previously viewed content or portions thereof may be skipped or otherwise passed over. Therefore, operation 514 may help to prevent a user from viewing content that he or she has already seen, although the content may belong to a particular group.

In some embodiments, operation 514 may be presented as an option to the user. For example, there may be some instances where a user may wish to re-watch a particular content, and/or another user may have viewed the content and the particular user may want to view it, and so on. After operation 514, the method 500 may return to operation 510, which may determine whether there is other content in the group.

If in operation 512, the method 500 determines that the other content in the group has not been viewed, the method may proceed to operation 515. Operation 515 may determine whether a stop command has been received, e.g., whether an input has been provided to the content receiver 201 indicating that a user may no longer wish to view content. If a stop command has been received, the method 500 may terminate. However, if in operation 515 a stop command has not been received, the method 500 may proceed to operation 516.

Operation 516 retrieves the additional content related to the originally selected content. For example, the content receiver 201 may retrieve (from storage) the other episodes that may correspond to a particular title 306, description 310 and the like. Additionally or alternatively, the content receiver 201 may retrieve the other content that may have originally been presented in a chronological order, e.g., by ascending time slots 304.

After operation 516, the method 500 may proceed to operation 518 and the additional content may be presented. The content receiver 201 may present the additional content selectively, e.g., a single episode at a time. The method 500 may allow for multiple shows to be grouped and presented in a variety of different manners. For example, content may be grouped by date and time but may also (or alternatively) be grouped by title 306 and/or episode identifier 308. This may allow the content receiver 201 to represent the content in a chronological order, e.g., recall and present the content as it was originally displayed on the select date in the select time slots. Additionally, the content receiver 201 may present the content based on episodes. For example, the first episode of a particular content (which may have been recorded at a later date) may be present first and a the second episode then be presented second (although it may have been recorded first).

In one embodiment, the content receiver 201 may present content originally displayed at the 7 pm time slot, then present content displayed at the 8 pm time slot and so on. In another embodiment, the content receiver 201 may present content corresponding to a particular episodic identifier 308. This embodiment may allow for content to be presented in episodically, rather than chronologically when it was presented and/or recorded. For example, episodes of a particular show may be presented out of their original order (e.g., due to syndication, re-runs, and so on). To address this, the content receiver 201 may be configured to record all of the episodes and then present the content in the original episode order.

Furthermore, as described in operation 512, the method 500 may further skip or otherwise not present content that may have already been viewed. For example, a user may have viewed content presented on a particular channel at an 8 pm time slot, but actually may be viewing stored content corresponding to the 7:30 pm slot. The content receiver 201 sequentially presents content corresponding to the 9 pm time slot, rather than the 8 pm time slot. Therefore, a user may not have to fast-forward or otherwise manually skip the content that he or she has already viewed. Similarly, a user may have viewed a particular episode of a show, but may be viewing a prior episode, the content receiver 201 may then skip the viewed episode and present the next episode, which may be based on episode identifier 308 and/or previously presented date, time slot 304 and the like.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method of presenting content stored on a content receiver, the method comprising:
   receiving, by a content receiver, a plurality of instructions to simultaneously record a plurality of instances of content, wherein:
      each of the plurality of instances of content corresponds to a separate television event on a separate television channel from a separate content provider,
      the plurality of instances of content are all received by a single tuner of the content receiver,
      the plurality of instances of content are encoded by a programming provider utilizing a same control word prior to being received at the content receiver, and
      the plurality of instances of content are decoded, by the content receiver, utilizing the same control word;
   recording, by the content receiver, at least two of the plurality of instances of content as specified by the plurality of instructions for a first time period;
   receiving, by the content receiver, a content selection;
   determining, by the content receiver, that the content selection includes first content that is a member of a group;
   determining a set of data associated with the group, wherein sets of data associated with a group include group criteria met by each member of the group;
   determining whether the first content is tagged with the set of data associated with the group;
   tagging the first content with data from the set of data if the first content is not tagged with the set of data associated with the group;
   searching for additional content that is a member of the group using the criteria; and
   transmitting, by the content receiver, the first content and the additional content, wherein when the first content and the additional content are received, at least one of the first content and the additional content is presented on a display device.

2. The method of claim 1, further comprising:
   determining by the content receiver, whether the first content of the group has been previously viewed; and
   if the first content has been previously viewed, skipping the presentation of the first content.

3. The method of claim 2, further comprising: presenting the additional content if the first content is skipped.

4. The method of claim 1, further comprising:
   determining, by the content receiver, that the first content includes a tag that indicates membership in the group.

5. The method of claim 1, further comprising:
determining, by the content receiver, that the first content is a member of the group based on a time slot that the first content was originally presented in.

6. The method of claim 1, further comprising:
determining, by the content receiver, that the first content is a member of the group based on at least one of a title of the first and an episode identifier of the first.

7. The method of claim 1, further comprising:
selecting, by the television receiver, the additional content of the group based on a lookup table that indicates content relationships.

8. The method of claim 1, further comprising:
selecting, by the television receiver, the additional content of the group based on at least one of a forward pointer and a backward pointer in the first content, wherein the forward pointer indicates a prior content and the backward pointer indicates a following content.

9. The method of claim 1, wherein the plurality of instances of content are encoded by a programming provider utilizing a same control word prior to being received at the content receiver, and the plurality of instances of content are decoded, by the content receiver, utilizing the same control word.

10. The method of claim 1, wherein tagging the first content with data includes inserting metadata into the electronic file storing the content.

11. The method of claim 1, wherein searching for additional content that is a member of the group using the criteria includes scanning data associated with each piece of content stored on the content receiver.

12. The method of claim 1, further comprising:
determining that the additional content is a member of the group by comparing the set of data associated with the group to additional data associated with the additional content; and
determining that the additional content is the same as the set of data associated with the group within a predetermined threshold.

13. A method of presenting content stored on a content receiver, the method comprising:
receiving, by the content receiver, a plurality of instructions to simultaneously record a plurality of instances of content, wherein:
each of the plurality of instances corresponds to a separate television event on a separate television channel from a separate content provider,
the plurality of instances of content are all received by a single tuner of the content receiver,
the plurality of instances of content are all included in the same frequency band of the broadcast signal,
recording, utilizing the content receiver, at least two instances of content of the plurality of instances of content via a first communication link as specified by the plurality of instructions for a first time period;
receiving a content selection by the content receiver;
determining, by the content receiver, that the content selection indicates content that is a member of group;
determining data associated with the group, wherein data associated with a group includes group criteria met by members of the group;
determining whether the content is tagged with the set of data associated with the group;
tagging the content with the data if the first content is not tagged with the data associated with the group; and
outputting for presentation, by the content receiver, at least the content and a second content member of the group, wherein the second content is presented following the content and in absence of a user command.

14. The method of claim 13, further comprising
determining at the content receiver if at least one content member of the group has been previously viewed; and
if a member of the group has been previously viewed, skipping the presentation of the previously viewed content member and presenting a non-viewed content member.

15. A content receiver comprising:
a first communication component configured to receive an instruction to simultaneously record a plurality of instances of content, wherein:
each of the plurality of instances of content corresponds to a separate television event on a separate television channel from a separate content provider,
the plurality of instances of content are all received by a single tuner of the content receiver,
the plurality of instances of content are encoded by a programming provider utilizing a same control word prior to being received at the content receiver, and
the plurality of instances of content are decoded, by the content receiver, utilizing the same control word;
a second communication component configured to receive at least one instance of supplemental content from a second content provider in accordance with a supplemental instruction to record the at least one instance of supplemental content;
a storage medium;
a first processor unit configured to:
cause at least two of the plurality of instances of content received from the separate content providers utilizing the first communication component to be stored in the storage medium in response to the instruction; and
cause the at least one instance of supplemental content received from the second content provider utilizing the second communication component to be stored in the storage medium in response to the supplemental instruction; and
a digital video recorder comprising an input component that receives a content selection; and
a second processor unit in communication with the input component that:
determines that first content selected by the content selection is a member of a content group;
determines a set of data associated with the group, wherein a set of data associated with a group includes group criteria met by each member of the group;
determines whether the first content is tagged with the set of data associated with the group;
tags the first content with data from the set of data if the first content is not tagged with the set of data associated with the group;
searches for additional content that is a member of the group using the criteria; and
outputs to a display device the first content selected by the content selection and the additional content.

16. The system of claim 15, wherein determining that the first content is a member of the content group is based on a tag of the content, wherein the tag is a broadcast time and date, and the second processor unit is further configured to cause output for presentation of the content indicated by the content selection and the at least one other member of the content group chronologically based on the broadcast time and date.

17. A system for presenting content comprising a content receiver, the content receiver comprising:

a first communication component that is configured to receive, from a first content provider, an instruction to record a plurality of instances of content from at least one broadcast signal received from the first content provider and a supplemental instruction to record at least one instance of supplemental content from a second content provider utilizing a second communication component, wherein each of the plurality of instances of content corresponds to a separate television event on a separate television channel that is associated with a separate content provider, and wherein:
- the at least one instance of supplemental content is associated with at least one of the plurality of instances of content, and
- the plurality of instances of content are all received by a single tuner of the content receiver, the second communication component configured to receive the at least one instance of supplemental content;

a storage medium;

a first processor unit that is configured to simultaneously store at least two of the plurality of instances of content received from the first content provider utilizing the first communication component in the storage medium in response to the instruction and stores the at least one instance of supplemental content received from the second content provider utilizing the second communication component in the storage medium in response to the supplemental instruction;

a digital video recorder comprising an input component that receives a content selection that selects content; and a second processor unit in communication with the input component that:
- determines that the content selected by the content selection is a member of a content group,
- determines data associated with the group, wherein data associated with a group includes group criteria met by members of the group;
- determines whether the content is tagged with the set of data associated with the group using the criteria;
- tags the content with the data if the first content is not tagged with the data associated with the group; and
- outputs to a display device the content selected by the content selection and a second content member of the group, wherein the second content is presented following the content and in absence of a user command.

18. The system of claim 17, wherein the content and second content are outputted to the display device according to an original consecutive airing sequence, wherein the airing sequence is chronological.

19. The system of claim 18, wherein airing sequence is based on an original broadcast time or date.

20. The system of claim 17, wherein the plurality of instances of content are all included in the same frequency band of the broadcast signal, the plurality of instances of content are encoded by a programming provider utilizing a same control word prior to being received at the content receiver, and the plurality of instances of content are decoded, by the content receiver, utilizing the same control word.

* * * * *